May 8, 1951 J. S. TROTH ET AL 2,552,353
CUTTING DIE
Filed Oct. 25, 1946 2 Sheets-Sheet 1
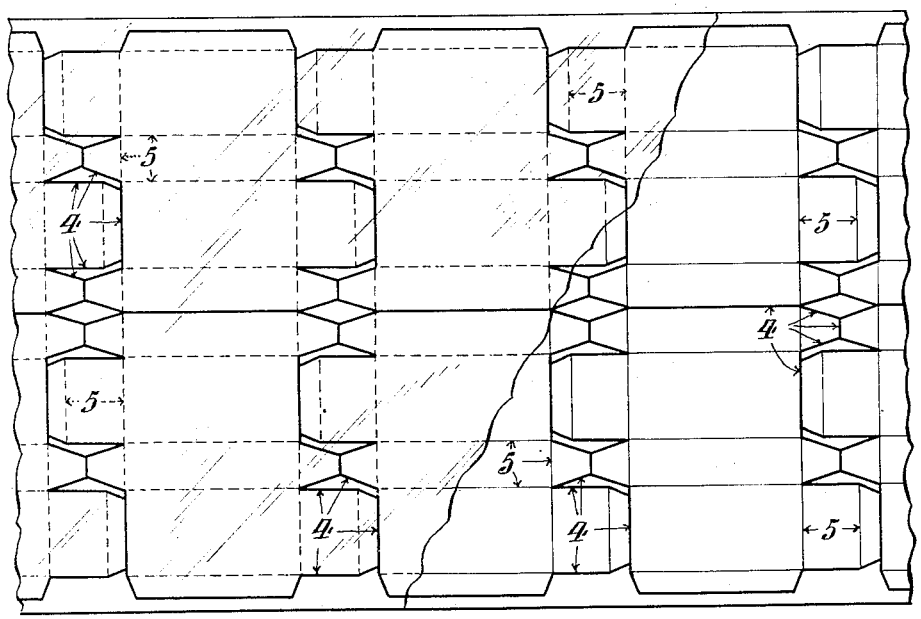
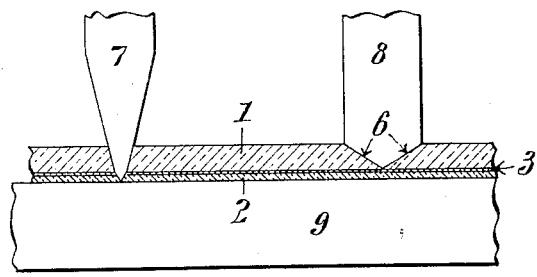
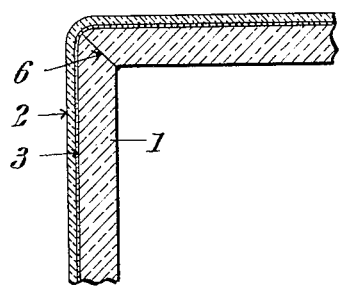
WITNESSES
INVENTORS:
John Shipley Troth &
Stanley Bright, Jr.,
BY
Paul & Paul
ATTORNEYS.

May 8, 1951 J. S. TROTH ET AL 2,552,353
CUTTING DIE
Filed Oct. 25, 1946 2 Sheets-Sheet 2
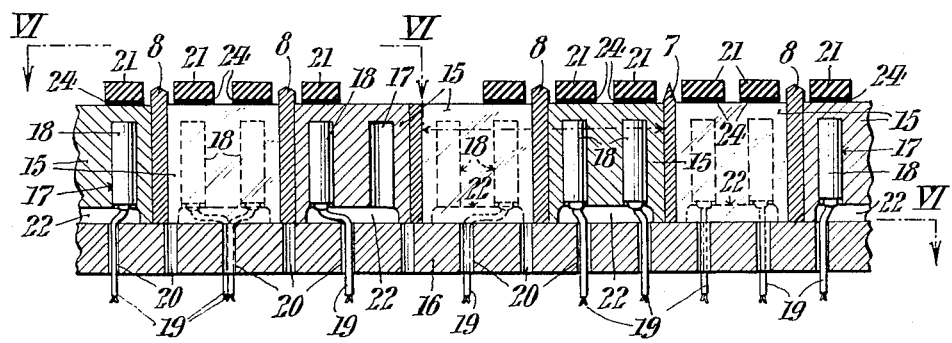
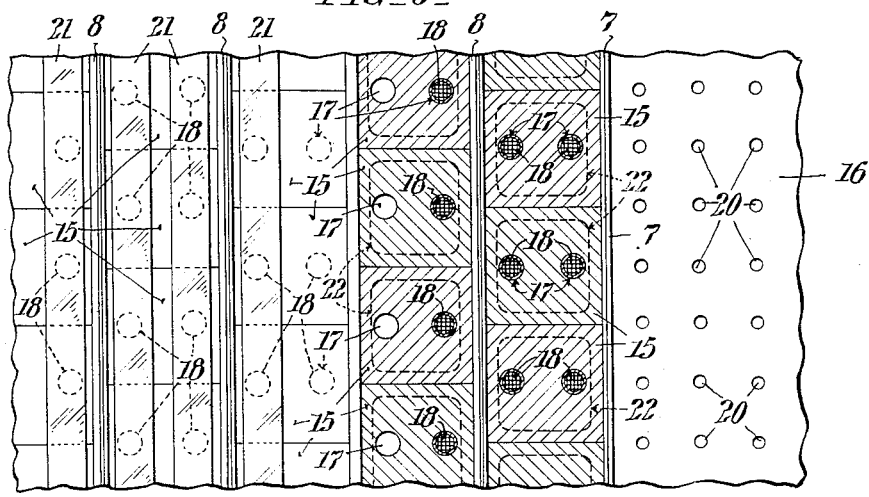
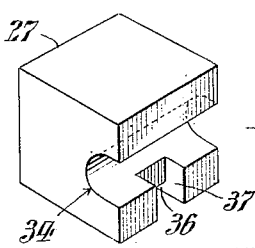
INVENTORS:
John Shipley Troth &
Stanley Bright, Jr.,
BY Paul & Paul
ATTORNEYS.

Patented May 8, 1951

2,552,353

UNITED STATES PATENT OFFICE 2,552,353

CUTTING DIE

John Shipley Troth, Wayne, and Stanley Bright, Jr., Haverford, Pa., assignors, by mesne assignments, to Robert Gair Company, Inc., New York, N. Y., a corporation of Delaware Application October 25, 1946, Serial No. 705,574

2 Claims. (Cl. 164—29)

This invention relates to containers made of plastic materials and processes for the manufacture of such containers; and this application is a continuation in part of our application for a United States patent, filed on April 26, 1946, under Serial No. 665,162, now abandoned.

According to some methods of manufacture of containers from plastic laminated material, the laminated blank is cut out and scored for subsequently bending the blank along folding lines when it is formed into the finished container. An example of this operation and the finished product is fully described in our above identified patent application. It is very desirable in the performance of this cutting and scoring operation that the union between the laminations not be weakened and that the surfaces formed on each side of the scoring be regular, uniform and smooth. The cutting of a sheet of laminated plastic tends to weaken the union of the laminations along the edge of the cut which results in structural weakness in the finished product. There is also a tendency for the cutting action to become a rough fracturing rather than a smooth shearing operation with consequent roughness and ravelling of the resulting edge. The same general tendency appears in a cutting which is in the form of a scoring operation and this is particularly detrimental where the surfaces formed in the scoring operation must be smooth and regular for ultimate functional contact as in our earlier invention identified above.

One object of our invention, therefore, is to provide an improved means for cutting and scoring laminated plastic material.

A further object of our invention is the provision of improved means for scoring relatively rigid plastic material in the formation of adjacent surfaces for subsequent operative contact as in the case of the manufacture of containers and container blanks.

A further object of our invention is to provide a means for binding or fusing the edges of plastic laminations during a cutting or scoring operation.

Still further objects and advantages of our invention will become apparent from the following detailed description of a preferred form thereof, reference being made to the accompanying drawings.

Fig. 1 of the drawings is a cross section through a laminated sheet whose laminations are of different thicknesses and shows one of the laminations partially rolled back.

Fig. 2 is a layout of a laminated sheet of plastic material after cutting, with a part of the thin flexible sheet broken away.

Fig. 3 shows a method of cutting and scoring the laminated sheet of Fig. 1.

Fig. 4 shows a corner of the container formed by the folding of the laminated container blanks cut from the sheet shown in Figs. 1 and 2 by the method shown in Fig. 3.

Fig. 5 is a fragmentary vertical section of a suitable assembly of knife and scoring blades in combination with heating elements.

Fig. 6 is a plan of the assembly of Fig. 5 partly in staggered section as indicated by arrows VI—VI in Fig. 5.

Fig. 7 is a fragmentary vertical section of a modification of the assembly shown in Figs. 5 and 6 in which heating elements are in direct contact with cutting elements and extend longitudinally thereof.

Fig. 8 is a perspective view of a spacing element formed according to the modification shown in Fig. 7.

In describing the embodiments of this invention shown in the drawings, a specific terminolgy will be adopted for the purpose of clarity, but it is to be understood that it is not intended thereby to limit the invention by this detailed description to the specific form of the illustrative embodiments theerof. Each term adopted for descriptive purposes is intended to include all technical equivalents thereof.

In the manufacture of these containers from plastic materials by means of laminated sheets subjected to a scoring and cutting operation, we have found that certain advantages result from heating the cutting elements, i. e. the knife and scoring elements. We have found that when these laminated blanks are cut or scored by a properly heated cutting edge, the laminations of the blank are subject to a fusing or binding effect along the edge cut by the heated cutting edge. This facilitates the cutting operation and at the same time strengthens the laminations and avoids the tendency of the laminations to spread apart along the edge subjected to a cold cutting action. We have also found that this operation avoids any tendency to a fracturing effect with resultant roughness of the edge.

In the manufacture of containers according to the invention disclosed in our prior patent application identified above, a cutting operation is described for forming and scoring with adjacent surfaces designed for operative contact with each other when the container blank is folded into a container as is illustrated in Fig.

4 hereof. We have found that when heat is applied to the cutting or scoring element, these operative surfaces (6 of Figs. 3 and 4) are formed by a combined molding and cutting operation which provides smooth and regular surfaces for subsequent operative contact. By heating these cutting elements, any tendency to fracture is overcome. This is of particular importance where the container blank is made up of laminations which include a layer of relatively thick, rigid plastic material 1 laminated to a layer of relatively flexibe pastic material 2 by means of a suitable adhesive material 3 as described in the above identified prior application.

For the purpose of clarity this invention will be described with reference to the container and methods of manufacture thereof shown in our application identified above and reference is made to that application for a more full description of the container to which the following description refers. Of course our invention has application to other methods of manufacture utilizing plastic materials as will be apparent to one skilled in the art. In the practice of our invention the laminated material shown in Fig. 1 is placed on a flat surface 9 (Fig. 3) and is cut to the desired container blanks as indicated in Fig. 2 in which figure the heavy solid lines 4 are cutting lines passing entirely through both the thicker and more rigid sheet 1 and the thinner and more flexible sheet 2. The dotted lines 5 in Fig. 2 indicate scoring along the desired folding lines, the scoring extending through rigid sheet 1 but not through thin sheet 2. As indicated in Fig. 3 the cuts along lines 4 and the scoring along lines 5 in Fig. 2 are controlled by the depth to which cutting elements 7 and 8 are permitted to penetrate with respect to the elements of the laminated sheet. The space formed in the notch of the folding line cut is determined by the angle of the cutting edge of the scoring blade and by the heat action. This angle may be from 100° to 120° thus providing working clearances. The arrangement and assembly of such knives 7 and scoring elements 8 and the control of the depth of their penetration is well understood by those skilled in the art and need not be the subject of a detailed description here.

After the cutting operation, the box blanks are folded and glued in accordance with the teaching of our patent application identified above. The present invention is directed to the performance of the above described cutting and scoring operation by means of heating the cutting elements, i. e. the knives 7 and scoring elements 8, so that the advantages referred to above are obtained. It has been found in the practice of our invention that excellent results are obtained by heating the cutting elements 7 and 8 to temperatures ranging from about 200° F. to about 450° F. depending upon the type of plastic material and the thickness thereof. Cutting element 7 should be heated to a higher temperature than cutting element 8 in order to achieve the desired fusing action. Suitable materials and thicknesses are set forth in our prior application referred to above.

The means for accomplishing this heating of the cutting elements comprises an assembly of cutting elements 7 and 8 with spacing members 15 all supported by a frame member 16 as appears in Fig. 5. According to our invention the spacing members 15 are formed with cavities 17 which receive heating elements 18. These heating elements 18 are energized for heating purposes electrically through an electric conduit 19 which is led through opening 20 in the frame member 16. A recessed area 22 is formed in the bottom surface of the spacing element 15 to facilitate the passage of conduit 19 to opening 20. In the operation of this form of our invention, electricity is used for operating the heating elements 18 which in turn heat the spacing elements 15 which directly heat the cutting elements 7 and 8 to the desired temperatures preliminary to the cutting and scoring operation described above. The type of electrical heating element may be left to the skilled artisan. Mounted on the spacing elements 15 are resilient rubber elements 21 which are compressed against the laminated sheet in advance of and during the cutting operation and positively disengage the cutting elements 7 and 8 on the accomplishment of their cutting function. This is important in order to avoid any prolonged heating of the laminated plastic material with resultant distortion or malformation. Interposed between the spacing element 15 and the resilient rubber element 21 is a layer 24 of heat insulating material to protect the rubber element 21 from the heat of the spacing element 15.

Figs. 7 and 8 show a modified form of heating and spacing elements according to which the heating element 25 is in direct contact with the cutting element 26 for the purpose of heat transfer. This form of our invention requires a modified form of spacing element 27 as clearly appears in the perspective view shown in Fig. 8. In this form of our invention the heating elements 25 extend along the cutting elements 26 in direct contact therewith and throughout the length thereof which permits more rapid heating and avoids the necessity of heating the spacing elements. This form of our invention is particularly effective where cutting elements 26 are comparatively long. The form of the invention shown in Fig. 5 is particularly effective where the cutting elements are comparatively short. It will be obvious to one skilled in the art that it will be advantageous to combine in one assembly both forms of our invention so that long cutting edges are heated according to the form shown in Fig. 7 and short cutting edges are heated according to the form shown in Fig. 5 of the drawings. Referring again to the modified form of our invention shown in Fig. 7 it will be noted that the frame member 30 is formed with cross channels 31 and 32 in the top surface thereof in order to accommodate electrical conduits 33 between spacing members 27 and frame member 30. Spacing member 27 has formed therein a longitudinal slot 34 to accommodate the heating element 25 which is secured to cutting element 26 by retaining element 35. A transverse channel 36 is formed in the underside of spacing member 27 and a channel 37 connects channel 36 with slot 34. This provision of channels and slots in spacing element 27 permits considerable flexibility in leading conduits 33 from the heating elements 25 through the holes 38 to a source of electrical power.

While this invention has been described above in considerable detail and certain modifications thereof suggested, it will be apparent to those skilled in the art that various other changes and modifications may be made without departing from the spirit and scope of the invention as defined in the following claims.

Having thus described our invention, we claim:

1. The combination of a plurality of cutting elements mounted on a frame member, spacing elements disposed between said cutting elements, and a heating element mounted on each of said cutting elements, each said spacing element having a side longitudinal channel formed therein to receive one of said heating elements.

2. The invention of claim 1 characterized further by the fact that an additional channel is formed in the lower face of said spacing member and in communication with said face longitudinal channel for the accommodation of an electrical conduit leading from said heating element through a hole formed in said frame member to a source of power.

JOHN SHIPLEY TROTH.
STANLEY BRIGHT, Jr.

REFERENCES CITED

The following references are of record in the file of this patent:

UNITED STATES PATENTS

| Number | Name | Date |
| --- | --- | --- |
| 751,527 | Marr | Feb. 9, 1904 |
| 1,793,089 | Heyes | Feb. 17, 1931 |
| 1,825,505 | Carraine | Sept. 29, 1939 |
| 2,195,819 | Kurtzeborn | Apr. 2, 1940 |
| 2,213,797 | Claussner | Sept. 3, 1940 |
| 2,319,099 | Abramson | May 11, 1943 |
| 2,328,063 | Dodge | Aug. 31, 1943 |
| 2,360,275 | Rau | Oct. 10, 1944 |
| 2,425,388 | Oestricher | Aug. 12, 1947 |
| 2,437,295 | Eastwood | Mar. 9, 1948 |

FOREIGN PATENTS

| Number | Country | Date |
| --- | --- | --- |
| 452,347 | Great Britain | Aug. 20, 1936 |